US012621774B2

(12) United States Patent
Wang et al.

(10) Patent No.: US 12,621,774 B2
(45) Date of Patent: May 5, 2026

(54) MANAGING ENERGY USAGE OF A USER EQUIPMENT DEVICE FOR WIRELESS COMMUNICATIONS

(71) Applicant: Google LLC, Mountain View, CA (US)

(72) Inventors: Jibing Wang, San Jose, CA (US); Erik Stauffer, Mountain View, CA (US)

(73) Assignee: Google LLC, Mountain View, CA (US)

( * ) Notice: Subject to any disclaimer, the term of this patent is extended or adjusted under 35 U.S.C. 154(b) by 292 days.

(21) Appl. No.: 18/554,428

(22) PCT Filed: Mar. 23, 2022

(86) PCT No.: PCT/US2022/021550
§ 371 (c)(1),
(2) Date: Oct. 6, 2023

(87) PCT Pub. No.: WO2022/231734
PCT Pub. Date: Nov. 3, 2022

(65) Prior Publication Data
US 2024/0236862 A1     Jul. 11, 2024

Related U.S. Application Data

(60) Provisional application No. 63/181,464, filed on Apr. 29, 2021.

(51) Int. Cl.
*H04W 52/02*          (2009.01)

(52) U.S. Cl.
CPC .............................. *H04W 52/0261* (2013.01)

(58) Field of Classification Search
CPC ................................................ H04W 52/0261
See application file for complete search history.

(56) References Cited

U.S. PATENT DOCUMENTS

2006/0141968 A1      6/2006   Masaki
2011/0051642 A1      3/2011   Krishnaswamy
(Continued)

FOREIGN PATENT DOCUMENTS

CN          101938819 A      1/2011
EP            3035748 A1 *    6/2016    ........ H04W 36/1443
(Continued)

OTHER PUBLICATIONS

Sun et al., "Joint Offloading and Computation Energy Efficiency Maximization in a Mobile Edge Computing System," IEEE Transactions on Vehicular Technology, vol. 68, No. 3, Mar. 2019, pp. 3052-3056.

(Continued)

*Primary Examiner* — Gbemileke J Onamuti
(74) *Attorney, Agent, or Firm* — Womble Bond Dickinson (US) LLP

(57)          ABSTRACT

Techniques for improving, for a set of conditions at a UE, the usage of energy stored at a UE include determining a preferred or requested partitioning of the UE's stored energy usage during wireless data transfer between the UE and the base station (e.g., an amount or percentage of stored energy utilized by the UE for baseband signal processing with respect to the amount or percentage of energy utilized by the UE for radio interface signal processing tasks), and indicating the preferred partitioning to the base station or network. Based on the indication, the base station/network may modify the baseband communication scheme, parameters, and/or values, and/or the radio interface communication scheme, parameters, and/or values utilized for the wireless transfers of data between the base station and the UE, thereby better managing (and in some cases, optimizing) the UE's stored energy usage and increasing battery life at the UE.

20 Claims, 5 Drawing Sheets

(56) References Cited

U.S. PATENT DOCUMENTS

| 2015/0049657 | A1 | 2/2015 | Cheng et al. |
| 2015/0334653 | A1 | 11/2015 | Ang et al. |
| 2019/0163250 | A1 | 5/2019 | Lee et al. |
| 2019/0182702 | A1 | 6/2019 | Wang et al. |
| 2019/0342843 | A1 | 11/2019 | Raghavan et al. |
| 2019/0380093 | A1 | 12/2019 | Ang et al. |
| 2020/0245251 | A1 | 7/2020 | Su |
| 2020/0260376 | A1 | 8/2020 | Islam |

FOREIGN PATENT DOCUMENTS

| JP | 2009206627 | A | 9/2009 |
| KR | 2021 0001159 | A | 1/2021 |
| WO | 2017029738 | A1 | 2/2017 |
| WO | 2020145865 | A1 | 7/2020 |

OTHER PUBLICATIONS

Shojafar et al., "Energy-efficient Adaptive Resource Management for Real-time Vehicular Cloud Services," IEEE Transactions on Cloud Computing, vol. 7, No. 1, Jan./Mar. 2019, pp. 196-209.

Shallari et al., "Communication and Computation Inter-Effects in People Counting Using Intelligence Partitioning, Journal of Real-Time Image Processing" (2020) 17:1869-1882 (https://doi.org/10.1007/s11554-020-00943-6).

Abderazek et al., "Advanced Power Management Techniques for Mobile Communication Systems," Jan. 2007, ResearchGate, https://www.researchgate.net/publication/228453002.

International Search Report and Written Opinion for PCT/US2022/021550 mailed Jun. 27, 2022.

Japanese Patent Application No. 2023-566555 Office Action dated Sep. 30, 2025.

* cited by examiner

<u>100</u>

300

305

Detect condition(s) at UE

310

Receive radio interface and/ or baseband communication scheme/parameters

Determine preferred partitioning of energy consumption of the UE corresponding to a transfer of data between the UE and a base station    302

Transmit an indication of the preferred partitioning of UE energy consumption to the base station/network    308

400

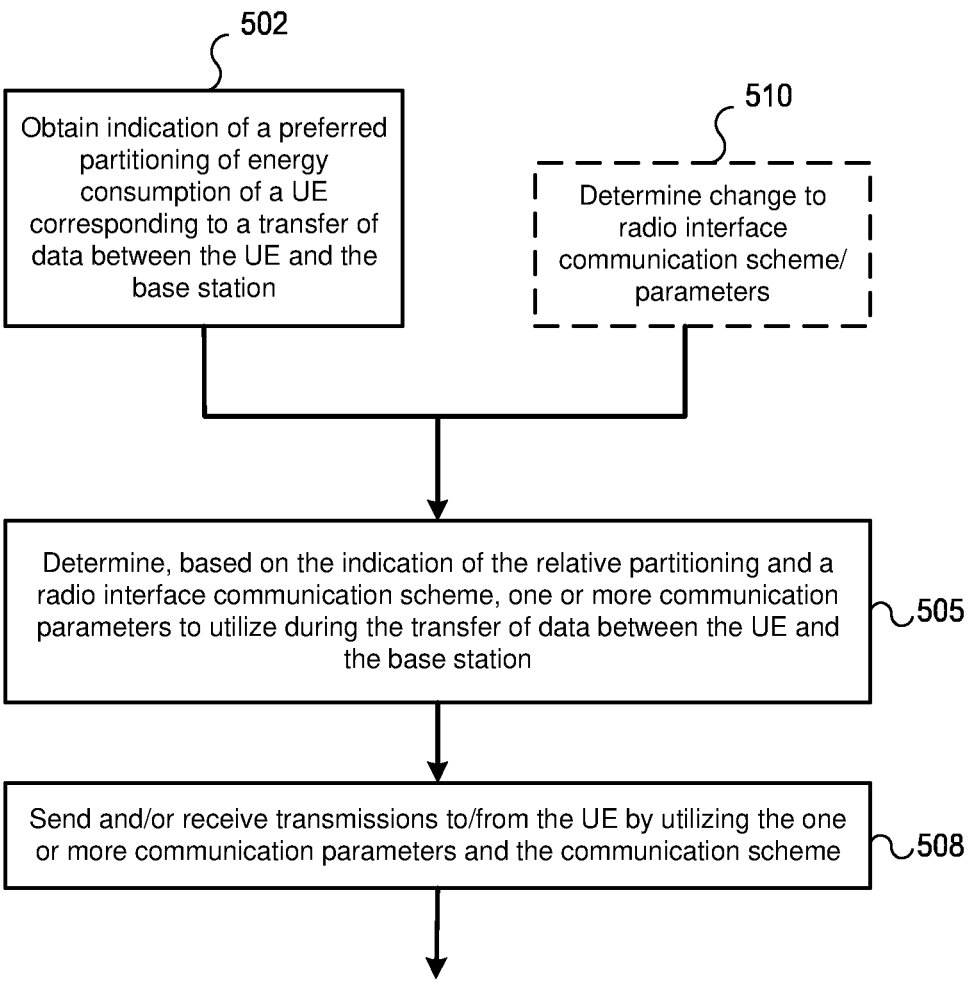

500

502

Obtain indication of a preferred partitioning of energy consumption of a UE corresponding to a transfer of data between the UE and the base station

510

Determine change to radio interface communication scheme/ parameters

Determine, based on the indication of the relative partitioning and a radio interface communication scheme, one or more communication parameters to utilize during the transfer of data between the UE and the base station

505

Send and/or receive transmissions to/from the UE by utilizing the one or more communication parameters and the communication scheme

MANAGING ENERGY USAGE OF A USER EQUIPMENT DEVICE FOR WIRELESS COMMUNICATIONS

CROSS-REFERENCE TO RELATED APPLICATIONS

The present application is a 371 U.S. national stage application of International Application No. PCT/US2022/021550 filed on Mar. 23, 2022, which claims priority to and the benefit of U.S. Provisional Patent Application No. 63/181,464 filed on Apr. 29, 2021 and entitled "MANAGING ENERGY USAGE OF A USER EQUIPMENT DEVICE FOR WIRELESS COMMUNICATIONS," all of which is incorporated herein by reference in the entirety.

FIELD OF THE DISCLOSURE

This disclosure relates to wireless communications and, more particularly, to managing the energy usage of a user equipment (UE).

BACKGROUND

The background description provided within this document is for the purpose of generally presenting the context of the disclosure. Work of the presently named inventors, to the extent described in this background section, as well as aspects of the description that may not otherwise qualify as prior art at the time of filing, are neither expressly nor impliedly admitted as prior art against the present disclosure.

User device or equipment units (UEs) have limited battery power, unlike base stations and other infrastructure components coupled to permanent power sources in a wired manner. A UE can use battery power for both baseband signal processing and supporting communications over radio interfaces, e.g., radio interface signal processing. For example, when the UE receives a video stream from a base station via a radio interface, the UE consumes energy to perform radio interface signal processing (such as demodulation and channel decoding) in accordance with a radio interface communication scheme, and subsequently consumes energy to perform baseband signal processing (such as source decoding and optionally data decompression) in accordance with a baseband communication scheme to obtain the video stream content at the UE. Generally speaking, the amount of energy consumed by the UE for supporting radio interface signal processing corresponds to an energy consumption of a radio and modem of the UE, and the amount of energy consumed by the UE for baseband signal processing corresponds to an energy consumption of one or more processors of the UE, e.g., central processing units (CPUs), digital signal processors (DSPs), guardian service processors (GSPs), etc.

The efficiency of stored energy consumption or usage for these types of wireless communications tasks may be measured in units of bytes of data transferred per energy unit, such as bytes transferred per picojoule (pJ). For example, the energy usage efficiency of baseband signal processing may correspond to the number of bytes the UE is able to source-code and compress per picojoule of battery energy consumed, while the energy usage efficiency of the usage of radio interface signal processing by the UE for wireless communications may correspond to the number of bytes the UE is able to channel-code and modulate per pJ of battery energy consumed by the UE.

Because various components of a communications system select and/or negotiate different communication schemes and/or communication parameters based on current (e.g., ongoing, present, presently-occurring, or immediate) conditions (such as conditions at the UE, characteristics of the radio interface, network performance, etc.), the energy usage efficiencies of the UE for supporting baseband signal processing and for supporting radio interface signal processing may vary as conditions vary. For example, upon detecting certain radio interface characteristics or conditions, the base station may change or adjust the radio interface signal processing parameters utilized between the base station and UE to achieve greater spectral efficiency, and consequently may send a corresponding set of updated communication parameters to the UE. The UE's use of the updated parameters may cause the UE's energy usage efficiency corresponding to radio interface signal processing and/or the UE's energy usage efficiency corresponding to baseband signal processing to change.

Today, typically the base station makes these types of changes and/or adjustments without consideration to the effect on the energy usage efficiency of the UE. As such, the changes/adjustments may have an adverse effect on the battery life of the UE, such as when the changed/adjusted communication scheme requires the UE to inefficiently (and, in some cases, unnecessarily) consume energy.

SUMMARY

The techniques described in this document improve, for a set of conditions at a UE, the energy usage or consumption of the UE by determining a preferred partitioning of stored energy consumption at the UE during wireless data transfer between the UE and the base station (e.g., a preferred partitioning of the amount or percentage of stored energy utilized by the UE for baseband signal processing with respect to the amount or percentage of energy utilized by the UE for radio interface signal processing), and indicating the preferred partitioning to the base station or network. Based on the indication of the preferred UE energy usage partitioning, the base station and/or network may modify or adjust the baseband communication scheme and/or parameters thereof utilized for wireless transfers of data to/from the UE (e.g., source coding, data compression, source decoding, data decompression, etc.), and/or the base station and/or network may modify or adjust the radio interface communication scheme and/or parameters thereof utilized for the wireless transfers of data to/from the UE (e.g., channel coding, modulation, channel decoding, demodulation, etc.), thereby better managing (and in some cases, optimizing) stored energy usage and increasing battery life at the UE for wireless communications/data transfer with the base station.

Generally, with respect to wireless data transfer between the UE and the base station, the efficiency of stored energy consumption (bytes per pJ) of the UE for performing baseband signal processing and the efficiency of stored energy consumption (bytes per pJ) of the UE for performing radio interface signal processing may vary based on different dynamic conditions. For example, as more local tasks execute at the UE and utilize the UE's processor(s) and other shared computing resources, the stored energy usage efficiency of the UE to perform baseband signal processing during wireless data transfer may decrease. In another example, as interference on the radio interface decreases and/or as bandwidth of the radio interface increases, the stored energy usage efficiency of the UE to perform radio interface signal processing during wireless data transfer may increase. Typically, as the complexity of baseband signal processing increases, the stored energy usage efficiency of the UE for performing baseband signal processing decreases, and vice versa. Similarly, as the complexity of radio interface signal processing increases, the stored energy usage efficiency of the UE for performing radio interface signal processing decreases, and vice versa. Accordingly, as conditions affecting wireless communications/data transfer between the UE and the base station change, the stored energy usage efficiency of baseband signal processing at the UE and/or the stored energy usage efficiency of radio interface signal processing at the UE may respectively change.

Generally, for case of reading, this document generally utilizes the terms "energy usage," "energy consumption," "energy usage efficiency," and the like to refer to, respectively, the usage, consumption, and efficiency of energy stored at the UE, e.g., in a battery or other suitable energy storage device of the UE. On the other hand, this document refers to energy which is not stored at the UE (such as energy provided by an external charging cable, mains power and/or other suitable external source of power) explicitly as "external" or "externally provided," e.g., external with respect to the UE.

At any rate, the techniques described in this document may manage the stored energy usage of a UE by, for example, determining the preferred partitioning of energy consumption of the UE based on the energy usage efficiency of the UE for performing baseband signal processing, the energy usage efficiency of the UE for performing radio interface signal processing, and/or the relativity or ratio of the two different energy usage efficiencies. In an example, based on the energy usage efficiencies for baseband signal processing and for radio interface signal processing, the preferred partitioning may indicate that baseband signal processing may utilize up to 20% of the stored UE energy during wireless data transfer with the base station, and that radio interface signal processing may utilize up to 80% of the stored UE energy during the wireless data transfer. For instance, the preferred partitioning may indicate a relative weighting of 1 to 4 (e.g., 1:4) of baseband signal processing energy consumption with respect to radio interface signal processing energy consumption. In another example, the preferred partitioning may indicate that the baseband signal processing at the UE is to utilize the minimum amount of energy needed to perform source coding and no data compression, and that the radio interface signal processing at the UE may utilize any remaining amount of energy for wireless data transfer between the UE and the base station. In still another example, the preferred partitioning may indicate that the radio interface signal processing at the UE is to utilize the minimum amount of energy needed to perform QAM for modulation, and the baseband signal processing at the UE may utilize any remaining amount of energy. Of course, other partitioning of stored energy consumption of the UE is possible.

The preferred partitioning of UE energy consumption between baseband signal processing and radio interface signal processing may vary for different sets of dynamic conditions, and/or the preferred relative partitioning may be dynamically determined, e.g., as conditions change. In some embodiments, the UE and/or the base station or network may store an energy usage profile of the UE for wireless data transfer with base stations, where the profile may indicate different levels of baseband signal processing complexity which are respectively associated with different types and/or parameters of radio interface communication schemes and/or with different conditions. In some implementations, the preferred partitioning of UE energy consumption may be determined based on various goals or criteria related to managing the overall stored energy consumption of the UE associated with wireless data transfer. For example, the preferred partitioning may allow the overall stored energy consumption of the UE to remain steady, stable, or relatively constant even as conditions affecting the UE and the radio interface change. In another example, the preferred partitioning may allow the UE to maximally conserve remaining battery life, e.g., while conditions affecting the UE and the radio interface change. Additionally, the techniques described within this document allow for different energy consumption partitions for uplink signaling of control and/or data signals from the UE to the base station and downlink signaling of control and/or data signals from the base station to the UE.

In an embodiment, a method in a user equipment device (UE) for managing energy usage of the UE for wireless communications includes determining, by processing hardware of the UE, a preferred partitioning of energy consumption of the UE between baseband signal processing performed by the UE and radio interface signal processing performed by the UE during wireless transfer of data between the UE and the base station; and transmitting, by the processing hardware to the base station, an indication of the preferred partitioning of UE energy consumption.

In an embodiment, a method for managing energy consumption at a user equipment device (UE) for wireless communications includes obtaining, by processing hardware of a base station, an indication of a preferred partitioning of energy consumption of the UE between baseband signal processing performed by the UE and radio interface signal processing performed by the UE during wireless transfer of data between the UE and the base station; and determining, by processing hardware based on the indication of the preferred partitioning of UE energy consumption and a communication scheme utilized by the UE and the base station, one or more communication parameters to utilize during the wireless transfer of data between the UE and the base station. The method additionally includes at least one of: sending, by the processing hardware, first transmissions to the UE by utilizing the communication scheme and the one or more communication parameters; or receiving, by the processing hardware, second transmissions from the UE by utilizing the communication scheme and the one or more communication parameters.

In an embodiment, one or more tangible, non-transitory memories store an energy usage profile for a User Equipment (UE). The energy usage profile indicates a respective level of complexity of baseband signal processing to utilize during wireless data transfer between the UE and a base station for each level of a plurality of levels of complexity of radio interface signal processing supported by UE. Each level of complexity of baseband signal processing corresponds to a respective magnitude of an efficiency of energy usage of the UE to perform baseband signal processing at the each level of complexity of baseband signal processing, and each level of complexity of radio interface signal processing corresponds to a respective magnitude of an efficiency of energy usage of the UE to perform radio interface signal processing at the each level of complexity of radio interface signal processing. Additionally, within the energy usage profile, increasing magnitudes of energy usage efficiency of the UE to perform the respective levels of complexity of baseband signal processing are associated with decreasing magnitudes of energy usage efficiency of the UE to perform the associated levels of complexity of radio interface signal processing. Based on the stored energy usage profile of the UE, the UE and the base station wirelessly transfer data therebetween.

BRIEF DESCRIPTION OF THE DRAWINGS

FIG. 5 is a flow diagram of an example method in a network element for managing energy usage of a UE for wireless communications in accordance with at least some of the principles and techniques disclosed within this document.

DETAILED DESCRIPTION

Figure 1:
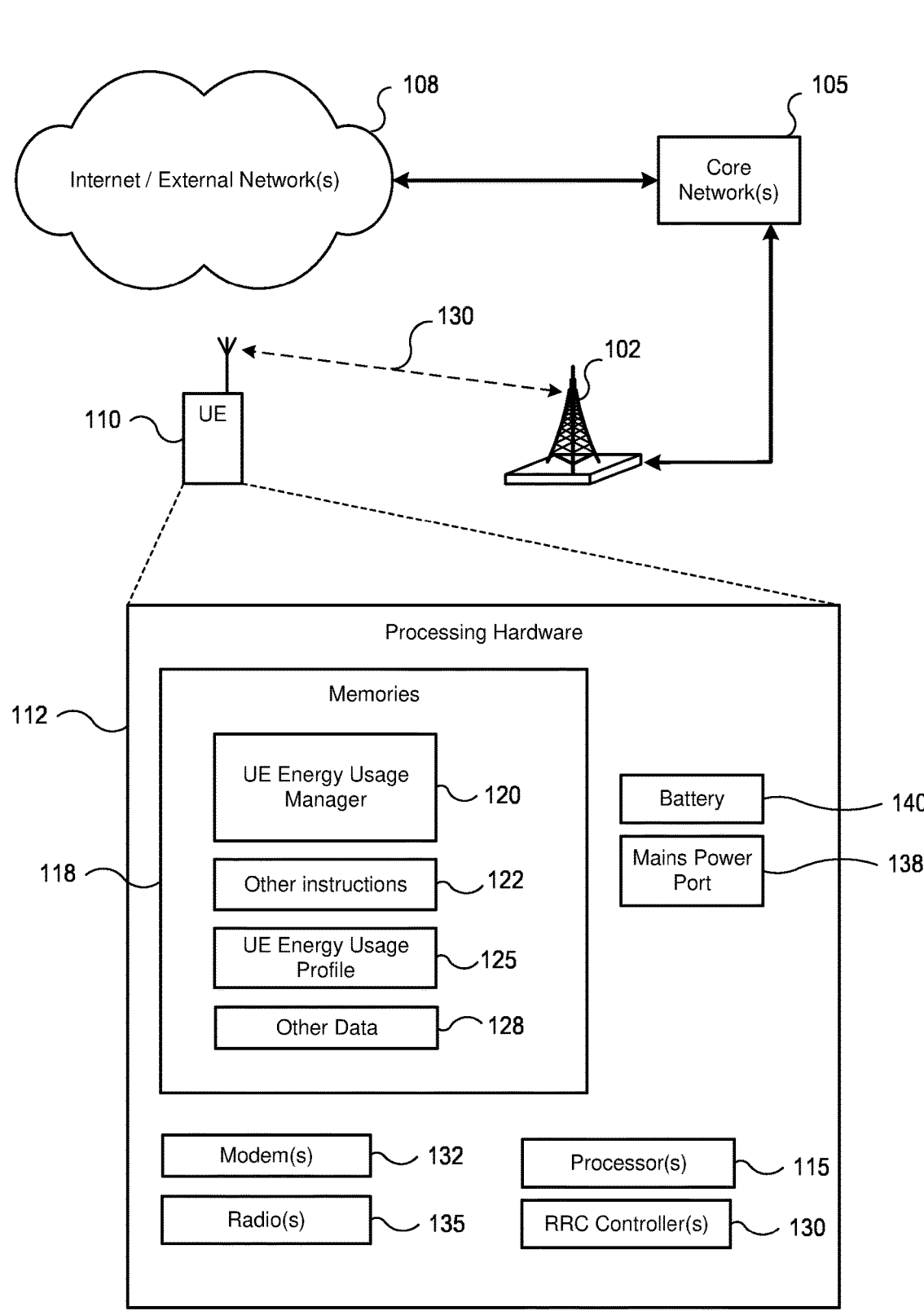
FIG. 1 depicts an example wireless communication system in which devices such as base stations and User Equipments (UEs) communicate data, and that supports the managing of UE energy usage in accordance with at least some of the principles and techniques disclosed in this document.

FIG. 1 depicts an example wireless communication system 100 in which devices such as base stations and user equipments (UEs) communicate, and that supports the managing of energy usage of UEs in accordance with one or more of the methods, principles, and/or techniques disclosed in this document. As illustrated in FIG. 1, the system 100 includes a base station 102 that supports one or more Radio Access Networks (RANs) of corresponding one or more Radio Access Technologies (RATs). For example, the one or more RATs may include NR and/or EUTRA. In some cases, at least some of the RANs supported by the base station 102 may utilize unlicensed frequency bands. As illustrated in FIG. 1, the base station 102 may communicatively connect to one or more respective core networks (CNs) 105, each of which in turn communicatively connects to the Internet and/or to any number of other private or public networks 108.

A User Equipment (UE) 110, which can be any suitable device capable of wireless communications via one or more types of RANs, may communicatively connect with the wireless communication system 100 via base station 102. The UE 110 includes processing hardware 112 that can include one or more processors 115 (e.g., central processing units (CPUs), digital signal processors (DSPs), guardian service processors (GSPs), etc.) and one or more non-transitory, tangible, computer-readable memories 118 storing instructions 120, 122 that the one or more processors 115 may read and/or execute. Particularly, the instructions 120 include instructions for managing the energy usage of the UE 110 in accordance with one or more of the methods, principles, and techniques disclosed in this document.

In an example implementation of the UE 110, the computer-executable instructions 120 are executable by the one or more processors 115 to perform any one or more of the portions of the described methods and/or techniques. The memories 118 may store data such as a stored energy usage profile 125 and other data 128 which may be utilized to perform any one or more of the portions of the described methods and/or techniques. In some implementations, the one or more processors 115 execute the computer-executable instructions 120, 122 to operate in conjunction with firmware and/or other portions of the processing hardware 112 to perform any one or more of the portions of the described methods and/or techniques.

The example processing hardware 112 includes components that the UE 110 utilizes to wirelessly transfer data to and from base stations (e.g., base station 102) over radio interfaces 130 by using various communication schemes. A "communication scheme," as utilized herein, generally refers to processing which is performed on data that is to be transferred between the UE 110 and the base station 102 to, for example, attempt to optimize transmission efficiencies and maintain fidelity of the source or original data in view of dynamic conditions at the UE and of the radio interface 130. Generally speaking, the UE and the base station determine and arrive at a communication scheme and associated parameters for transferring data therebetween. The communication scheme which is utilized by the base station and the UE may include a baseband communication scheme and a radio interface communication scheme. The baseband communication scheme may include baseband signal processing (e.g., processing related to the original data signal, whether analog or digital) activities or and/functions such as source coding, source decoding, data compression, data decompression, and/or other types of processing on baseband signals. The radio interface communication scheme may include radio interface signal processing (e.g., processing related to the wireless radio frequency (RF) signal via which the data is transmitted via carriers of the radio interface) activities and/or functions such as, for example, modulation, demodulation, channel coding, channel decoding, and/or other types of radio signal processing corresponding to transmitting and receiving wireless signals over carriers of the radio interface. For example, the one or more processors 115 (e.g., CPUs, DSPs, etc.) of the UE 110 may perform one or more baseband signal processing activities or functions, and one or more Radio Resource Control (RRC) controllers 130, modem(s) 132, and radio(s) 135 of the UE 110 may perform radio interface signal processing activities and/or functions.

Typically, the UE 110 includes a mains power port 138 to receive a charging cable or similar suitable connector to mains power (which may be, for example, alternating-current (AC) electric power delivered from an electrical power grid infrastructure or power provided by some other external electric power source). While connected to mains power via the mains power port 138, the UE 110 consumes energy provided by the mains power source to perform activities or functions associated with wirelessly transferring data to and from base stations, as well as to perform other functions and applications. Further, when connected to mains power via the port 138, the UE 110 may cause an on-board (e.g., internal) battery or other suitable energy storage device 140 to store at least some of the energy which the UE 110 obtains from mains power (e.g., the UE 110 may charge the battery 140) so that power or energy is locally available from the battery 140 for the UE 110 to consume when the UE 110 is disconnected from mains power.

Figure 2:
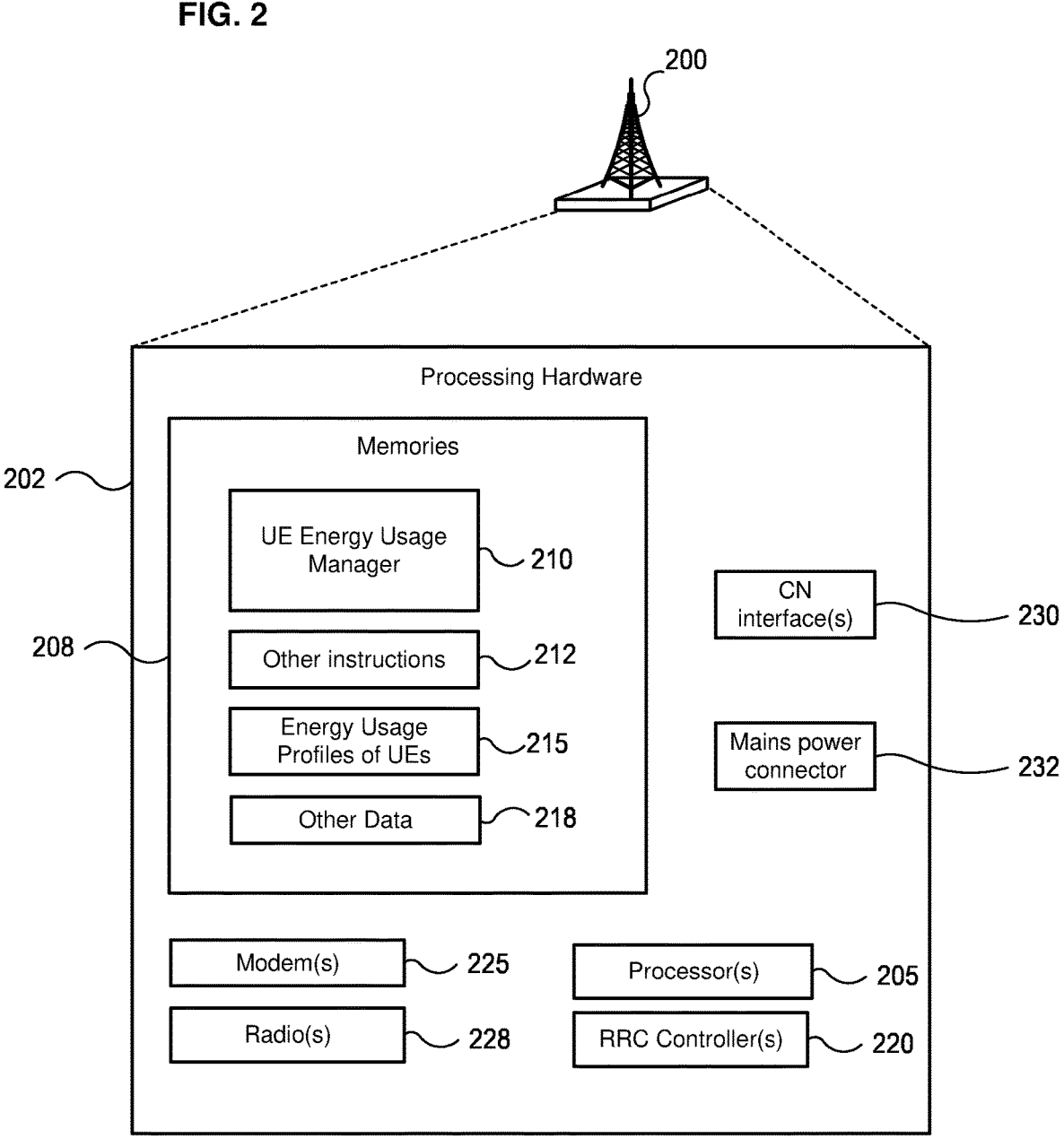
FIG. 2 depicts a more detailed block diagram of an example base station included in the wireless communication system of FIG. 1.

FIG. 2 depicts a more detailed block diagram of an example base station 200 which may be included in the example wireless communication system 100 of FIG. 1. For example, the example base station 200 may be implemented as the base station 102. As shown in FIG. 2, the base station 200 includes example processing hardware 202 that includes one or more processors 205 and one or more tangible, non-transitory computer-readable memories 208 storing computer-executable instructions 210, 212. Particularly, the instructions 210 include instructions for managing the stored energy usage of UEs (e.g., of the UE 110 and/or or of other UEs) in accordance with one or more of the methods, principles, and techniques disclosed in this document. This document discusses FIG. 2 with simultaneous reference to the communication system 100 and the UE 110 of FIG. 1 for the purposes of illustration and not for limitation purposes. For example, the base station 200 may be utilized in systems other than the system 100, and/or in conjunction with UEs other than the UE 110.

In an implementation, the computer-executable instructions 210, 212 are executable by the one or more processors 205 to perform any one or more of the portions of the described methods and/or techniques. The memories 208 store data 215, 218 utilized to perform any one or more of the portions of the described methods and/or techniques. In particular, the memories 208 may store one or more stored energy usage profiles 215 corresponding to one or more UEs, which the base station may utilize while managing stored energy usage of the UEs in accordance with one or more of the methods, principles, and techniques disclosed in this document. In some implementations, the one or more processors 205 execute the computer-executable instructions 210 to operate in conjunction with firmware and/or other portions of the processing hardware 202 to perform any one or more of the portions of the described methods and/or techniques.

The example processing hardware 202 of the base station 200 includes components that the base station 200 utilizes to wirelessly transfer data to and from the UE 110 and/or other UEs. As previously discussed, the UE 110 and the base station determine and arrive at a communication scheme and associated parameters for transferring data therebetween. The communication scheme may include baseband signal processing (e.g., processing related to the original data signal, whether analog or digital) and radio interface signal processing (e.g., processing related to the wireless radio frequency (RF) signal via which the data is transmitted via carriers of the radio interface). For example, the one or more processors 205 (e.g., CPUs, DSPs, GSPs, etc.) of the base station 200 may perform baseband signal processing activities or functions such as source coding, source decoding, data compression, data decompression, and/or other types of processing on baseband signals. Additionally, one or more Radio Resource Control (RRC) controllers 220, modem(s) 222, and radio(s) 225 of the base station 200 may perform radio interface signal processing activities and/or functions such as, for example, modulation, demodulation, channel coding, channel decoding, and/or other types of radio signal processing corresponding to transmitting and receiving wireless signals over carriers of the radio interface.

The example processing hardware 202 also includes one or more core network interfaces 230 that the base station 200 uses to connect with and communicate digital signals to/from a respective core network (e.g., CN 105). In some embodiments, each particular CN interface 230 connects with only a single, different type of CN, and in some embodiments, a single one of the one or more core network interfaces 230 connects with multiple types of CNs. Additionally, the base station 200 includes a connection 232 to a source of mains power. Generally speaking, the base station 200 is continually connected to a primary source of mains power (e.g., via mains power connector 232) or to a suitable back-up to the primary source of mains power.

Figure 3:
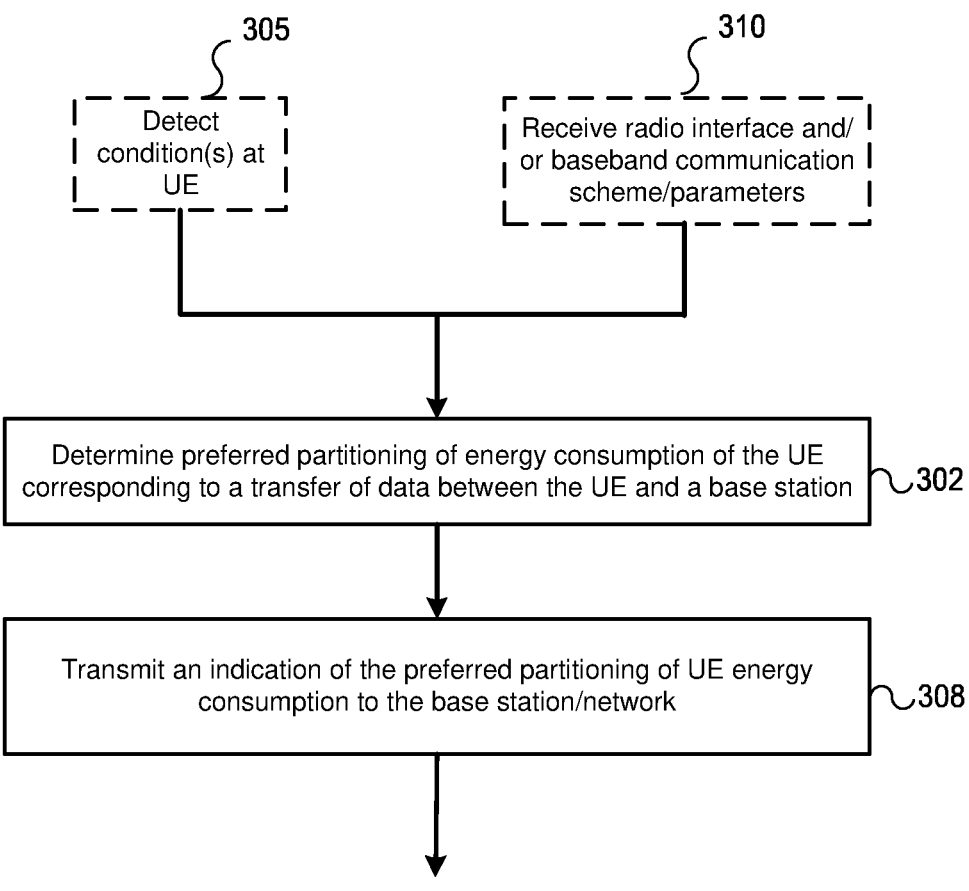
FIG. 3 is a flow diagram of an example method in a UE for managing energy usage of a UE for wireless communications in accordance with at least some of the principles and techniques disclosed within this document.

FIG. 3 depicts a flow diagram of an example method 300 in a UE for managing energy usage of the UE in accordance with one or more of the techniques disclosed within this document. For example, the UE may be the UE 110 of FIG. 1 or may be another UE which performs at least a portion of the method 300. The description of the method 300 below simultaneously references FIGS. 1-2 for clarity of illustration (and not limitation) purposes. Further, in some embodiments, at least portions of the method 300 may execute in conjunction with at least portions of one or more other methods described within this document. Still further, in some embodiments, the method 300 includes one or more alternate and/or additional actions other than those shown in FIG. 3.

At a block 302, the method 300 includes determining a preferred partitioning of stored energy consumption or usage of the UE, e.g., a preferred partitioning between the use of stored energy for baseband signal processing performed by the UE and the use of stored energy utilized for radio interface signal processing performed by the UE to wirelessly transfer data to/from a base station. Generally speaking, the preferred partitioning allows the UE to optimize its battery life and/or stored energy consumption in view of conditions at and/or detected by the UE by, for example, allocating more and/or a higher percentage of stored energy towards the more efficient type of signal processing for the given conditions (whether baseband or radio interface), minimizing the rate of stored energy consumption, distributing the rate of consumption of stored energy over time, etc. For example, the UE may determine a magnitude of an efficiency of energy usage of the UE for baseband signal processing relative to a magnitude of the efficiency of energy usage of the UE for radio interface signal processing during the wireless transfer of data between the UE and the base station, and the UE may utilize the magnitudes of efficiencies to determine the preferred partitioning. As previously discussed, the efficiency of stored energy usage corresponds to a number of bytes of data which the UE is able to wirelessly transfer (e.g., to/from a base station) while the UE consumes a unit of power provided by the battery or stored energy device 140, e.g., bytes per picojoule, or bytes per other unit of power. Thus, the magnitude of the energy usage efficiency usage of the UE for baseband signal processing indicates a magnitude of the number of bytes which the UE is able to baseband signal process (e.g., during wireless data transfer to/from the base station) while the UE consumes a unit of power, and the magnitude of the efficiency of energy usage of the UE for the radio interface signal processing indicates a magnitude of the number of bytes which the UE is able to radio interface signal process (e.g., during wireless data transfer to/from the base station) while the UE consumes a unit of power. Accordingly, in some embodiments, the preferred partitioning of UE energy consumption may more heavily weight (or give preference to) the type of signal processing (e.g., baseband or radio interface) which has a higher magnitude of energy usage efficiency so that a greater percentage of stored energy is partitioned or allocated towards the more efficient type of signal processing, and vice versa.

Typically, as the UE executes a greater amount of local tasks and thus utilizes a greater, or higher clocked, portion of its processor resources and other shared computing resources to do so, the energy usage efficiency of the UE to perform baseband signal processing during wireless data transfer decreases. Also typically, as interference on the radio interface decreases, the energy usage efficiency of the UE to perform radio interface signal processing during wireless data transfer increases. Generally speaking, as the complexity of baseband signal processing increases (e.g., more complex source coding algorithms, higher rates of data compression, faster clock speeds, etc.), the energy usage efficiency of the UE for performing baseband signal processing decreases. Similarly, as the complexity of radio interface signal processing increases (e.g., more complex channel coding algorithms, more complex modulation schemes, more noise reduction for multipath or distortion, etc.), the energy usage efficiency of the UE for performing radio interface signal processing decreases. Accordingly, as conditions affecting wireless communications/data transfer between the UE and the base station change and baseband signal processing schemes and/or radio interface signal processing schemes change to accommodate the changing conditions, the stored energy usage efficiency of baseband signal processing at the UE and/or the stored energy usage efficiency of radio interface signal processing at the UE may respectively change.

The UE may determine 302 (and/or may be configured to determine) the preferred partitioning of stored energy usage between baseband signal processing and radio interface signal processing to maintain or achieve a target level of fidelity of transferred data and/or to maintain or achieve a target overall level and/or rate of stored energy consumption in view of changing conditions. As such, the UE may prefer a higher level of complexity of baseband signal processing when the complexity of radio interface signal processing is relatively low (and vice versa) in an attempt to achieve and/or maintain the target levels of data fidelity and/or stored energy consumption for wireless data transfer. The preferred partitioning may reflect the changing balance between the levels of complexity of the different types of signal processing towards maintaining, working towards, and/or achieving the target levels of data fidelity and/or stored energy usage/consumption. For example, when the remaining energy stored in the battery of the UE decreases to a particular level, the UE may prefer to expend less energy for baseband signal processing (e.g., to conserve battery life), and therefore may prefer a higher level of complexity of radio interface signal processing (e.g., a higher data rate over the radio interface). In another example, when high levels of interference are detected on the channel, the UE may prefer to partition or allocate more stored energy to support more complex levels of radio interface signal processing, and may partition or allocate less stored energy to support baseband signal processing. In yet another example, if one or more data streams are transferred between the base station and the UE via a sub-6 GHz frequency band and via a frequency band greater than 6 GHZ (e.g., due to duplicate transmissions of the same data stream over both the sub-6 GHz frequency band and the frequency band greater than 6 GHZ; due to dual connectivity during which two different data streams are respectively transmitted over the sub-6 GHz frequency band and over the greater than 6 GHz frequency band; due to the switching of the transmission of a single data stream from being transmitted over the sub-6 GHz frequency band to being transmitted over the greater than 6 GHz frequency band or vice versa, etc.), then transmissions via the sub-6 GHZ frequency band may need a higher level of data compression during baseband signal processing with respect to the level of data compression utilized for the frequency bands greater than 6 GHZ (e.g., mmWave, THz, etc., when bandwidth is wider and/or the signal-to-noise ratio (SNR) is higher relative to sub-6 GHz bands) to achieve an equal overall stored energy expenditure by UE.

In some embodiments, determining 302 the preferred partitioning of stored energy consumption or usage at the UE includes determining a respective maximum amount or rate of consumption of stored energy and/or a respective minimum amount or rate of consumption of stored energy for either baseband signal processing or radio interface signal processing based on conditions at and/or observed by the UE, and partitioning or allocating a remainder amount or rate of consumption of stored energy towards the other type of signal processing. For example, when the UE is connected to mains power and does not consume any stored energy for baseband signal processing, the UE may prefer and/or utilize a higher level of complexity of baseband signal processing even though the stored energy allocated or partitioned towards baseband signal processing is relatively low or even zero, and a remainder of the stored energy may be allocated or partitioned towards supporting radio interface signal processing of various levels of complexity. In another example, when a channel condition between the UE and the base station is of high quality (e.g., high SNR), large bandwidth, use of analog beamforming, etc.), the UE may prefer to allocate or partition only the energy amount or rate of consumption to support a relatively simple radio interface communication scheme, and may allocate or partition any remaining amounts and/or rates of consumption of stored energy towards various levels of complexity of baseband communication scheme.

Figure 4:
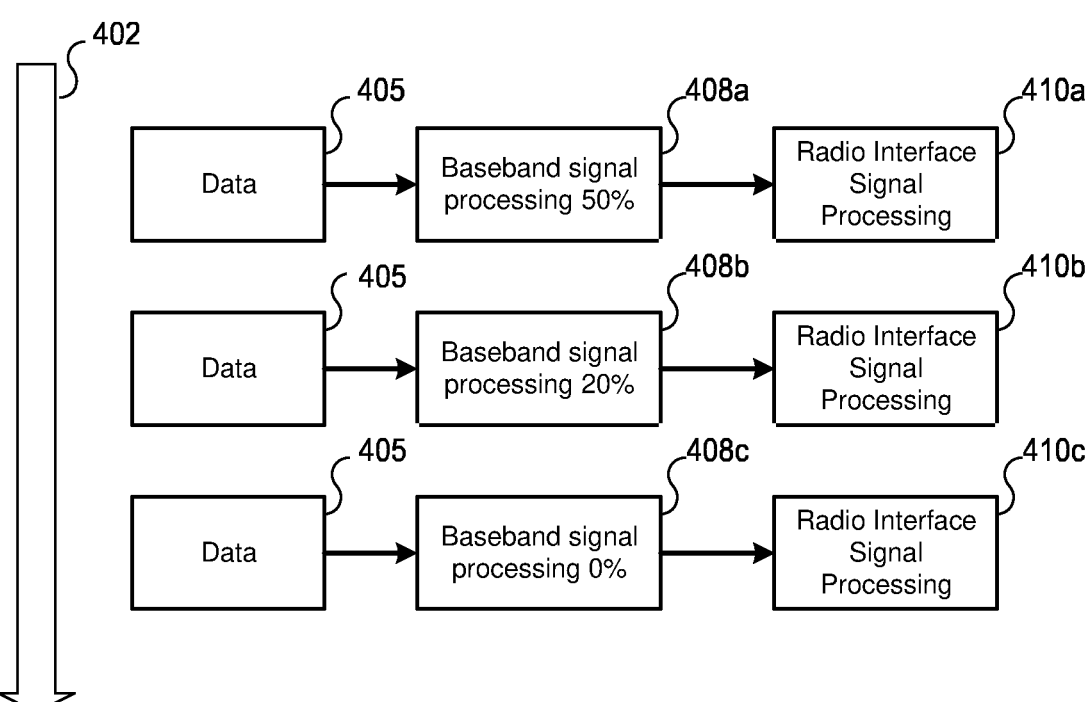
FIG. 4 is an example profile of stored energy usage of a UE in accordance with at least some of the principles and techniques disclosed within this document.

To illustrate, FIG. 4 depicts a block diagram of an example usage profile 400 of a UE corresponding to the UE's usage of energy which is locally stored at the UE, e.g., in a battery 140 or other local energy storage device. As the energy usage profile 400 corresponds to usage of energy which is locally stored at the UE (e.g., in contrast to mains power or energy provided to the UE by an external source of power or energy), this document interchangeably refers to the energy profile 400 of the UE as a "stored energy usage profile 400" of the UE. The UE may be the UE 110 of FIG. 1, or may be another UE. The stored energy usage profile 400 may be utilized in the system 100 of FIG. 1 and/or by the base station 200 of FIG. 2. For example, at least a portion of the UE energy usage profile 400 may be included in the energy usage profile 125 of the UE 110, and/or at least a portion of the UE energy usage profile 400 may be included in the energy usage profiles 215 of UEs stored at or otherwise accessible to the base station 200 of FIG. 1. Further, in embodiments, the UE energy usage profile 400 may be utilized by the method 300 of FIG. 3 and/or by the method 500 of FIG. 5. For clarity of illustration and not limitation purposes, this document discusses the energy usage profile 400 with simultaneous reference to FIGS. 1 and 2.

The example energy usage profile 400 corresponds to uplink wireless data transfer (e.g., transmissions of data from the UE to a base station), where the profile 400 corresponds to maintaining a total, overall, or aggregated amount or rate of consumption of energy stored at the UE for wireless uplink signal processing of the data (e.g., for baseband signal processing in combination with radio interface signal processing) at a relatively constant or steady level across different levels of energy usage efficiencies of baseband signal processing. In FIG. 4, the direction of the arrow 402 in FIG. 4 indicates decreasing energy usage efficiencies for performing baseband signal processing at the UE which may correspond to, for example, greater numbers of executing tasks at the UE which utilize shared processor resources, shared memory resources, and/or other shared computing resources at the UE, and/or to other computationintensive conditions at the UE. As such, in the direction of the arrow 402, the magnitudes of efficiencies of stored energy usage (e.g., as measured in bytes/pJ or other suitable units) for baseband signal processing at the UE decreases. That is, in the direction of the arrow 402, the UE requires greater amounts of energy to perform baseband signal processing of a set of data 405 which is to be wirelessly transferred from the UE to the base station. Accordingly, to maintain (or to attempt to maintain) a relatively stable amount or rate of aggregate stored energy consumption at the UE for wireless data transfer in view of changing computational needs and/or conditions at the UE, the profile 400 specifies that as energy usage efficiencies for baseband signal processing decrease (e.g., in the direction of the arrow 402), corresponding complexities of baseband signal processing decrease.

For example, assume that the UE is configured with a target or optimum level of baseband signal processing B (e.g., target level of complexity B of source coding, data compression, and/or other types of baseband signal processing techniques) which would be applied to data that is to be transmitted from the UE to the base station, e.g., the data set 405. B may be pre-defined or configured, for example, and may correspond to respective levels of complexity of source coding, data compression, etc. which would, if utilized, allow data to be transmitted to the base station in the most efficient manner and with the most fidelity possible given the available baseband signal processing routines and algorithms configured at the UE. Accordingly, in this example, the profile 400 defines baseband signal processing (e.g., of the data set 405) to be at a complexity level of 50% of B (block 408a) when baseband signal processing energy usage efficiency is greater; at a complexity level of 20% of B (block 408b) when the baseband signal processing energy usage efficiency decreases; and at a rate of 10% when the baseband signal processing energy usage efficiency is even more decreased. Each complexity level of baseband signal processing 408a, 408b, 408c may be a respective given or fixed level of complexity at which baseband signal processing is to be performed, or each complexity level of baseband signal processing 408a, 408b, 408c may be a respective maximum level of complexity which baseband signal processing is not to exceed, for example.

In another example, if the target for the overall, aggregate amount or rate of stored energy consumption at the UE for both baseband signal processing and radio interface signal processing is T, the energy usage profile 400 may indicate that baseband signal processing is to consume no more than 50% of T 408a when baseband signal processing energy usage efficiency is greater; a maximum of 20% of T 408b when baseband signal processing energy usage efficiency decreases; and no more than 10% of T 408c when baseband signal processing energy usage efficiency is even more decreased. Of course, other methods and/or ways to distinguish between different levels of baseband signal processing complexity 408a, 408b, 408c may be utilized by the energy profile 400, including arbitrary levels.

As such, as energy usage efficiency for baseband signal processing decreases (e.g., in the direction of the arrow 402), the example profile 400 indicates that the UE is to expend less stored energy towards baseband signal processing of the data 405, e.g., as denoted by references 408a, 408b, and 408c. Accordingly, for each level of complexity of baseband signal processing 408a, 408b, 408c, a corresponding remainder of the amount and/or rate of consumption of stored energy at the UE may be partitioned to support respective complexity levels of radio interface signal processing 410a, 410b, 410c (e.g., channel coding, modulation, etc.), as shown in FIG. 4. In some embodiments, each respective complexity level of radio interface signal processing 410a, 410b, 410c may be a given or fixed level of complexity, or may be a respective maximum level of complexity which radio signal processing is not to exceed.

Thus, returning to FIG. 3, in some embodiments the method 300 optionally includes determining or detecting 305, by the UE, one or more current conditions (e.g., conditions which are presently occurring at or presently detected by the UE), and determining 302 the preferred partitioning of stored energy usage between baseband and signal processing based on the determined current or present conditions. For example, the UE may determine that a current or present level of stored energy remaining in the battery or energy storage or a current/present predicted lifetime of the battery or energy storage device has decreased to a threshold level. The UE may determine that one or more components of the UE (or the UE as a whole) is overheating, e.g., that an amount of heat generated by the one or more UE components is greater than a threshold. Additionally or alternatively, the UE may detect the presence or occurrence of some other condition of one or more physical components of the UE which affects the energy efficiency (e.g., bytes/pJ) of wireless data transfer between the UE and the base station.

In some embodiments, determining or detecting 305 the one or more current or present conditions may include detecting or determining one or more conditions occurring at the UE which may affect the UE's energy usage efficiency for baseband signal processing. For example, the UE may determine that a current level of stored energy remaining in the battery or energy storage device has decreased below a pre-defined threshold level, and/or that the UE may determine that the UE has been connected to or disconnected from mains power. The UE may determine that a current or present load or other resource usage condition of one or more shared computational resources of the UE (e.g., processor(s), memories, etc.) has increased above a predefined threshold, for example, by monitoring a power rail of the UE (e.g., the power rail for a CPU, DSP, GSP, etc. Additionally or alternatively, the UE may determine that a particular task or a particular combination of tasks that utilize a larger percentage of shared resources are presently executing at the UE, for example, by monitoring a number, types, and/or identities of currently executing tasks, etc. Of course, the UE may detect and/or determine other additional or alternate conditions which may affect the UE's stored energy usage efficiency for baseband signal processing. Based on the detected or determined conditions, the UE may determine a corresponding level of baseband signal processing activity 408a, 408b, 408c (e.g., by accessing its stored energy profile 400 or by calculating or determining in real-time or on-the-fly) to thereby determine the preferred partitioning of the UE's stored energy consumption, in embodiments.

In some embodiments, determining or detecting 305 the one or more current or present conditions includes detecting or determining one or more conditions which may affect the UE's energy usage efficiency for radio interface signal processing, and/or which may affect radio signal transmissions over the radio interface between the UE and the base station. For example, the UE may determine that a current or present load associated with transmissions over the radio interface has increased above a predefined threshold, e.g., by monitoring a power rail of a modem and/or transceiver corresponding to the radio interface. The UE may detect a current or presently occurring radio interface characteristic, such as a frequency band, a bandwidth, a presence of beamforming, an SNR, an uplink throughput, a characteristic of a reference signal transmitted by the base station (e.g., demodulation reference signal, channel state information reference signal, sounding reference signal, etc.), a characteristic and/or condition of a channel, a modulation coding scheme, an amount of interference, a radio access technology (RAT), etc. Of course, the UE may detect other additional or alternate conditions which may affect the UE's stored energy usage efficiency for radio interface signal processing. Based on the detected or determined conditions, the UE may determine a corresponding level of baseband signal processing activity 408a, 408b, 408c (e.g., by accessing its stored energy profile 400 or by calculating or determining in real-time or on-the-fly) to thereby determine the preferred partitioning of stored energy consumption of the UE. For example, the detected or determined present conditions corresponding to the radio interface may influence or dictate a particular level of complexity of radio interface signal processing 410a, 410b, 410c to preserve sufficient fidelity of radio signal transmissions, and the UE may utilize the stored energy profile 400 to determine the corresponding level of complexity of baseband signal processing 408a, 408b, 408c for the particular level of radio interface signal processing 410a, 410b, 410c.

Of course, the profile 400 may indicate the partitioning of stored energy usage between baseband signal processing and radio interface signal processing by using information other than or in addition to levels of signal processing complexities 408, 410. For example, in some implementations, for different types and/or combinations of one or more current (e.g., presently occurring) computational conditions at the UE, the profile 400 may indicate respective levels of radio interface signal processing complexity. Additionally or alternatively, for different types and/or combinations of one or more current (e.g., presently occurring) radio interface conditions observed by the UE, the profile 400 may indicate respective levels of baseband signal processing complexity. In some implementations, the profile 400 may indicate respective levels of baseband signal processing complexity for different executing tasks or different combinations of executing tasks, and/or the profile 400 may indicate respective levels of radio interface signal processing complexity for different radio interface characteristics or different combinations of radio interface characteristics. In some implementations, the profile 400 may indicate respective levels of baseband signal processing complexity and/or respective levels of radio interface signal processing complexity for each communication scheme supported by the UE. In some configurations, the profile 400 may indicate respective levels of baseband signal processing complexity and/or respective levels of radio interface signal processing complexity for different physical conditions indicated the UE (e.g., remaining battery level or lifetime, overheating of one or more components, etc.). The profile 400 may alternatively or additionally utilize one or more other types of suitable indications, if desired. Generally speaking, the profile 400 may indicate respective levels of baseband signal processing complexity and/or respective levels of radio interface signal processing complexity for different sets of one or more conditions at, detected by, and/or observed by the UE.

Further, the UE may utilize different stored energy usage profiles 400 for different target levels of overall energy consumption for uplink wireless data transfer, if desired. For example, the UE may utilize a different stored energy usage profile 400 for different levels or amounts of remaining stored energy or for different battery lifetimes, for different usage modes, for different types of data content, etc.

Still further, the UE may utilize different stored energy usage profiles 400 for downlink wireless data transfers (e.g., transmissions of data from the base station to the UE) to maintain a total, overall, or aggregated amount or rate of consumption of energy stored at the UE for wireless downlink signal processing of data (e.g., for baseband signal processing in combination with radio interface signal processing) at a relatively constant or steady level across different levels of energy usage efficiencies of baseband signal processing. Similar to stored energy usage profiles for uplink wireless data transfers, different profiles may correspond to different target levels of overall stored energy consumption by the UE for wireless downlink data transfer.

In some embodiments of the method 300, the UE may determine 302 the preferred partitioning of stored energy consumption without accessing any stored energy profile 400. For example, upon determining or detecting 305 one or more presently-occurring conditions (e.g., at the UE or on the radio interface), the UE may determine 302 or calculate, e.g., in real-time or on-the-fly, the partitioning of the UE's stored energy consumption or usage between baseband signal processing and radio interface signal processing, e.g., based on the detected or determined one or more conditions.

Indeed, in some embodiments, detecting or determining 305 the one or more conditions (e.g., occurring at the UE and/or of the radio interface as observed by the UE) may trigger the determining 302 of the preferred partitioning of stored energy usage (e.g., by using or by not using a stored energy usage profile 400). For example, the UE may be triggered to determine 302 an updated preferred partitioning of energy usage each time the remaining amount of energy stored in the battery or energy storage device of the UE drops to a different, lower pre-defined level (e.g., where each lower pre-defined level could correspond to more aggressive stored energy conservation). The UE may be triggered to determine 302 a preferred partitioning of energy usage when certain types of tasks are executing at the UE, when a load on the CPU and/or DSP exceeds a certain threshold, when the power consumed by the modem exceeds a given threshold, when the UE detects an SNR above a given threshold or other condition of the radio interface, when the base station indicates a change to the communication scheme and/or associated communication parameters (e.g., for baseband signal processing and/or for radio interface signal processing), etc.

At a block 308, the method 300 includes transmitting an indication of the preferred partitioning of UE energy consumption to the base station and/or network. For example, the UE may transmit at least one of: an indication of a magnitude of an efficiency of energy usage of the UE for the baseband signal processing, an indication of a magnitude of an efficiency of energy usage of the UE for the radio interface signal processing, a percentage, ratio, or other suitable indication of the preferred partitioning between the types of signal processing, an indication of a maximum amount of power the UE prefers or requests to consume during baseband signal processing (e.g., per transferred byte of data), an indication of a maximum amount of power the UE prefers or requests to consume during radio interface signal processing (e.g., per transferred byte of data), a preferred or requested complexity level for one or more baseband signal processing techniques, a preferred or requested complexity level for one or more radio interface signal processing techniques, and/or another suitable indication of the UE's preferred partitioning between power consumed for baseband signal processing and power consumed for radio interface signal processing. The UE may transmit 308 the indication of the preferred partitioning to the base station via any suitable message or field such as an RRC (Radio Resource Control) message, a MAC (Medium Access Control) control element, etc. In some embodiments, the UE may transmit 308 its stored energy usage profile 400 to the base station so that the base station may store a local copy of the UE's energy usage profile 400.

Generally speaking, the base station or network is configured to optimize spectral efficiency and, to this end, may typically indicate to the UE to utilize a higher level of complexity of baseband signal processing in an attempt to achieve better spectral efficiency across the network. For example, at the block 310, the UE may receive, from the base station, an indication of the radio interface and/or baseband communication schemes and/or corresponding communication parameters which the UE is to use while transmitting/receiving data to/from the base station (e.g., during a connection procedure, or at some other time). However, as previously discussed, the level of complexity of baseband signal processing corresponding to the communication schemes and communication parameters indicated by the base station or network may be detrimental to the battery life of the UE. Accordingly, to optimize the management of remaining energy stored at the UE, in response to receiving 310 the communication scheme and/or communication parameters from the base station, the UE may determine 302 a more optimal preferred partitioning of stored energy usage of the UE between baseband signal processing and radio interface signal processing (e.g., by utilizing one or more stored energy profiles 400, and/or by calculating or determining one or more preferred partitionings on-the-fly based on current or present conditions), and the UE may transmit 308 an indication of the preferred partitioning(s) to the base station or network. The base station or network, upon receiving the indication of the preferred partitioning of the UE, may adjust its initial partitioning to accommodate (at least partially) the preferences of the UE, thereby enabling the UE to better manage and conserve its stored energy usage.

FIG. 5 depicts a flow diagram of an example method 500 in a network element for managing energy usage at the UE in accordance with one or more of the techniques disclosed within this document. For example, the UE may be the UE 110 of FIG. 1, or may be another UE. A base station (such as the base station 102, 200) may perform at least a portion of the method 500, in embodiments. Additionally or alternatively, a core network (such as the core network 105) may perform at least a portion of the method 500, in embodiments. The description of the method 500 below simultaneously references FIGS. 1-4 for clarity of illustration (and not limitation) purposes. Further, in some embodiments, at least portions of the method 500 may execute in conjunction with at least portions of one or more other methods described within this document, such as the method 300, and/or in conjunction with one or more stored energy profiles, such as the stored energy profile 400. Still further, in some embodiments, the method 500 includes one or more alternate and/or additional actions other than those shown in FIG. 5.

At a block 502, the method 500 includes obtaining, by processing hardware of a base station, an indication of a preferred or requested partitioning of energy consumption of the UE between baseband signal processing performed by the UE and radio interface signal processing performed by the UE during wireless transfer of data between the UE and the base station. The base station may obtain the indication of the UE's preferred partitioning from the UE, such as via a transmission sent by the UE while initially establishing the connection between the UE and the base station, and/or via a transmission sent by the UE corresponding to the block 308 of FIG. 3. Additionally or alternatively, the base station may obtain the indication of the UE's preferred partitioning by accessing an energy profile of the UE stored in a memory of the base station, such one of the stored energy usage profiles 215 stored in the memories 208 of the base station 200. Indeed, in some embodiments, the base station may store multiple energy usage profiles 215 corresponding to different individual UEs, different models of UEs, or different manufacturers of UEs.

For example, the base station may have previously obtained a copy of the UE's stored energy profile 215 (e.g., upon initially connecting with the UE via the radio interface, from the network, upon configuration, etc.), and may have stored the received profile 215 in its memories 208. Accordingly, based on an identification of the UE indicated by the UE (e.g., the device model of the UE and/or other identifying information, which may be included in a UECapabilityInformation or other suitable message transmitted by the UE to the base station), the base station may access or look up the particular stored energy usage profile 215 corresponding to the UE. In some situations, the UE additionally provides to the base station respective indications of presently occurring conditions at or observed by the UE (e.g., an amount of energy remaining in a battery or energy storage device of the UE, an amount of heat generated by one or more components of the UE, and/or other types of physical conditions of one or more components of the UE, which may be included in the UECapabilityInformation or other suitable message transmitted by the UE to the base station). Based on the identification of the UE and any indications of current or present conditions received from the UE, the base station may utilize the stored energy usage profile corresponding to the UE to determine the preferred stored energy usage partitioning of the UE.

At a block 505, the method 500 includes determining, by processing hardware based on the indication of the preferred partitioning of UE energy consumption and a communication scheme utilized by the UE and the base station, one or more communication parameters to utilize during the wireless transfer of data between the UE and the base station. For example, at the block 505, the method 500 may determine one or more communication parameters and/or communication parameter values associated with the baseband communication scheme, such as those corresponding to source coding/de-coding, an amount or level of data compression, etc. Additionally or alternatively, at the block 505 the method 500 may determine one or more communication parameters and/or communication parameter values associated with the radio interface communication scheme such as those corresponding to modulation, channel coding, etc. In some embodiments, at the block 505, the method 500 may determine, based on the preferred partitioning of stored energy utilization of the UE, that a different baseband and/or radio interface communication scheme altogether is to be utilized for data transfers between the UE and the base station.

Accordingly, at the block 505, the method 500 may include determining, by the base station, respective prescribed levels of baseband signal processing and/or of radio interface signal processing based on the preferred partitioning indicated by the UE and based on other conditions detected and/or determined by the base station, and the base station may determine the one or more communication parameters and/or communication parameter values based on the prescribed level(s) of baseband signal processing and/or of radio interface signal processing. In some situations, the prescribed level(s) of complexity may comport with or be in accordance with the preferred partitioning indicated by the UE. In some situations, the prescribed level(s) of complexity may differ from the preferred partitioning indicated by the UE, and as such may be modified level(s) of complexity.

Based on the determining 505, if, at the block 508, there is no change in communication parameters from what the base station and the UE had previously established, the method 500 may include sending 510 transmissions to the UE by utilizing the determined communication parameters and/or communication parameter values and/or receiving transmissions from the UE by utilizing the determined communication parameters and/or communication parameter values, e.g., in accordance with the prescribed level(s) of complexity for baseband signal processing and/or for radio interface signal processing of data. On the other hand, if, at the block 508, one or more communication parameters have changed with respect to the communication parameters that the base station and the UE had previously established, the base station may transmit 512 an indication of the determined communication parameter(s) and/or communication parameter value(s) to the UE prior to sending/receiving 510 data so that both the UE and base station utilize consistent baseband signal processing and consistent radio interface signal processing for data transfer therebetween. Accordingly, during wireless data transfer between the base station and the UE, the UE may consume energy for baseband signal processing at an efficiency greater than or equal to a magnitude of energy usage efficiency of the UE for baseband signal processing corresponding to the UE's preferred partitioning, and/or the UE may consume energy for radio interface signal processing at an efficiency greater than or equal to a magnitude of energy usage efficiency of the UE for radio interface signal processing corresponding to the UE's preferred partitioning.

Importantly, the preferred partitioning of stored energy usage of the UE between baseband signal processing and radio interface signal processing does not necessarily dictate that the base station or network must change communication schemes, parameters, and/or parameter values to strictly adhere to the preference of the UE. That is, the base station may, in some situations, determine communication parameters and/or values in accordance (e.g., entirely in accordance) with the UE's preferred partitioning. In other situations, the base station may determine communication parameters and/or values partially in accordance with the UE's preferred partitioning, as the base station and the network have broader views of radio interface resource usage (and indeed, other resource usages such as spectrum, network load, etc.) across the base station and/or the network, and as such may determine or select the communication schemes and/or parameters to maintain overall network performance and/or spectral efficiency at target threshold levels. However, rather than the base station/network not taking the preference of the UE into account at all, e.g., in the manner of currently known systems, even some accommodation by the base station/network towards UE preferences improves the management of stored energy at the UE, thereby increasing the battery life of the UE. Indeed, should the base station determine that strictly adhering to the UE's preferred partitioning is suitable given current base station and/or network conditions and indicate as such to the UE, wireless data transfers 508 between the base station and the UE would optimize stored energy usage at the UE.

To illustrate using an example scenario, and with simultaneous reference to FIGS. 1-5, a UE and a base station (e.g., the UE 110 and the base station 102) initiate a connection procedure via a particular RAT. As part of the connection procedure, the UE and the base station arrive at a modulation coding scheme (MCS) which is to be utilized by both the UE and the base station to transfer data therebetween. Different MCSs for uplink transmissions and for downlink transmissions may be possible. The UE (e.g., as per block 302) and/or the base station (e.g., as per block 502) may determine a preferred partitioning of stored energy consumption of the UE (in some situations, based on one or more conditions detected 305 at or by the UE). Based on the UEs preferred partitioning (and, in some cases, based on base station and/or network conditions and/or resource usage), the base station determines 505 one or more communication parameters and/or communication parameter values to utilize during the transfer of data between the UE and the base station, and indicates 508 the determined parameters and/or values to the UE. For example, the base station may maintain both the radio interface and baseband communications schemes for the connection and merely adjust respective parameter values thereof. In another example, the base station may maintain the radio interface communication scheme and adjust the values of some of the associated radio interface communication scheme parameters, as well as may change a portion of the baseband communication scheme. In another example, the base station may change the radio interface communication scheme without any changes to the baseband communication scheme.

Continuing with the example scenario, sometime after the UE and the base station have established their connection and are transferring data via the connection, the UE may detect 305 an occurrence of a condition which affects its preferred partitioning of stored energy usage, or the UE may receive 310, from the base station, an indication of one or more changed radio interface and/or baseband communication parameters. Consequently, the UE may determine 302 an updated preferred partitioning of stored UE energy consumption and transmit 308 an indication of the update to the base station. At the base station, upon the base station receiving 502 the updated preferred partitioning of the UE, the base station may assess whether or not any communication parameters and/or communication values may need to be updated in view of the UE's preferred partitioning and current (e.g., presently occurring) base station and/or network conditions. If the base station determines (block 505, YES leg of block 508) that updates to at least some communication parameters and/or parameter values may be needed, the base station may communicate 512 the updates to the UE and continue to send 510 transmissions to and/or receive 510 transmissions from the UE using the updated communication parameters and/or values.

Continuing further with the example scenario, at some point during the lifetime of the connection between the UE and the base station, the base station may determine 515, 505 a change to one or more radio interface communication schemes, parameters, and/or parameter values, e.g., based on base station radio interface equipment performance and/or status, based on radio interface resource usage, based on information from the network, etc. Based on the changed communication parameter(s) (e.g., the YES leg of block 508), the base station may indicate 512 such changes to the UE, so that the UE receives 310 the updates and may respond accordingly 302, 308 with an indication of an updated preference partitioning. Additionally or alternatively, upon the base station determining 515 the change to the one or more radio interface communication schemes, parameters, and/or parameter values, the base station may assess whether or not any baseband communication parameters and/or communication values may need to be updated in view of the UE's preferred partitioning (e.g., via the UE's energy profile 215 stored in the memory 208 of the base station) and current base station and/or network conditions. If the base station determines 505 that at least some baseband communication parameters and/or parameter values should be updated, the base station may communicate 512 the updates to the UE, and continue to send transmissions to and/or receive 510 transmissions from the UE using the changed radio interface communication schemes, parameters, and/or parameter values and using the updated baseband communication parameters and/or values.

Accordingly, as demonstrated above, the methods and techniques disclosed within this document provide significant advantages over known techniques for managing stored energy usage of the UE during wireless data transfer. With the presently disclosed methods and techniques, as the base station considers the preference or request of the UE for expending stored energy resources towards baseband signal processing and/or expending stored energy resources towards radio interface signal processing, the system may manage stored energy usage of the UE to thereby increase battery life at the UE and, in some situations, optimize the stored energy usage of the UE. Further, the management of UE stored energy usage may be adaptable or responsive to different conditions occurring at and/or detected by the UE. Still further, the system may attempt to maintain the UE's usage of stored energy at a relatively constant or steady level even as conditions at the UE and/or of the radio interface change.

The following additional considerations apply to the foregoing discussion.

A user device or User Equipment (UE) in which the techniques of this disclosure can be implemented (e.g., the UE 110) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IOT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for enhancing the handling of user equipment in a radio resource control inactive state through the principles disclosed in this disclosure. Thus, while this document illustrates and describes particular embodiments and applications, the disclosed embodiments are not limited to the precise construction and components disclosed. Various modifications, changes and variations, which will be apparent to those of ordinary skill in the art, may be made in the disclosed arrangement, operation and details of the method, and apparatus without departing from the spirit and scope defined in the appended claims.

The following list of examples reflects a variety of embodiments explicitly contemplated by the present disclosure.

Example 1. A method in a user equipment device (UE) for managing energy usage of the UE for wireless communications, the method comprising: determining, by processing hardware of the UE, a preferred partitioning of energy consumption of the UE between baseband signal processing performed by the UE and radio interface signal processing performed by the UE during wireless transfer of data between the UE and the base station; and transmitting, by the processing hardware to the base station, an indication of the preferred partitioning of UE energy consumption.

Example 2. The method of the preceding example, wherein determining the preferred partitioning of energy consumption of the UE includes determining a magnitude of an efficiency of energy usage of the UE for the baseband signal processing relative to a magnitude of the efficiency of energy usage of the UE for the radio interface signal processing during the wireless transfer of data between the UE and the base station.

Example 3. The method of any one of examples 1-2, wherein transmitting, to the base station, the indication of the preferred partitioning of UE energy consumption includes transmitting at least one of: an indication of a magnitude of an efficiency of energy usage of the UE for the baseband signal processing, or an indication of a magnitude of an efficiency of energy usage of the UE for the radio interface signal processing.

Example 4. The method of any one of examples 2-3, wherein the magnitudes of efficiency of energy usage of the UE are indicated in units of bytes of data transferred per unit of power consumed by the UE.

Example 5. The method of any one of examples 2-4, wherein the magnitude of energy usage efficiency of the UE for the baseband signal processing includes a magnitude of energy usage efficiency of the UE for at least one of: source coding, source decoding, data compression, or data decompression.

Example 6. The method of any one of examples 2-5, wherein the magnitude of energy usage efficiency of the UE for the radio interface signal processing includes a magnitude of energy usage efficiency of the UE for at least one of: channel coding, channel decoding, modulating, or demodulating.

Example 7. The method of any one of examples 2-6, wherein: determining the magnitude of energy usage efficiency of the UE for the baseband signal processing during the wireless transfer of data between the UE and the base station includes determining an amount of power needed by the UE for the baseband signal processing during a transfer of a byte of data between the UE and the base station; and determining the magnitude of energy usage efficiency of the UE for radio interface signal processing during the wireless transfer of data between the UE and the base station includes determining an amount of power needed by the UE for the radio interface signal processing during the wireless transfer of the byte of data between the UE and the base station.

Example 8. The method of any one of examples 2-7, further comprising: detecting, by the processing hardware of the UE, at least one of: a change to a wireless connection between the UE and the base station or a change to a remaining amount of energy stored in a battery or energy storage device of the UE; based on the detected at least one change, determining at least one of: an updated magnitude of energy usage efficiency of the UE for the baseband signal processing or an updated magnitude of energy usage efficiency of the UE for the radio interface signal processing; and transmitting, by the processing hardware to the base station, an indication of at least one of: the updated magnitude of energy usage efficiency of the UE for the baseband signal processing or the updated magnitude of energy usage efficiency of the UE for the radio interface signal processing.

Example 9. The method of the preceding example, wherein detecting the change to the wireless connection between the UE and the base station includes detecting a change to at least one of: a modulation coding scheme, a channel condition, a frequency band, or a radio access technology, or another radio interface characteristic.

Example 10. The method of any one of the preceding examples, wherein transmitting the indication of the preferred partitioning of UE energy consumption of the UE during the wireless transfer of data between the UE and the base station includes transmitting an indication of a preferred level of complexity of the baseband signal processing to utilize during the wireless transfer of data between the UE and the base station.

Example 11. The method of any one of the preceding examples, wherein determining the preferred partitioning of UE energy consumption during the wireless transfer of data between the UE and the base station includes determining the preferred partitioning of UE energy consumption during the wireless transfer of data between the UE and the base station based on one or more conditions at the UE.

Example 12. The method of the preceding example, wherein determining the preferred partitioning of UE energy consumption includes determining at least one of: a maximum allocation of UE energy for baseband signal processing or a maximum allocation of UE energy for radio frequency signal processing.

Example 13. The method of the preceding example, wherein the maximum allocation of UE energy is a maximum percentage allocation of energy stored at the UE.

Example 14. The method of any one of examples 11-13, wherein the one or more conditions at the UE include at least one of: a condition of one or more physical components of the UE, a resource usage condition at the UE, or a radio interface characteristic detected by the UE.

Example 15. The method of any one of examples 11-14, further comprising detecting, by the processing hardware of the UE, at least one of the one or more conditions.

Example 16. The method of the preceding example, wherein detecting the at least one of the one or more conditions includes detecting at least one present characteristic of a radio interface utilized by the UE and the base station.

Example 17. The method of the preceding example, wherein detecting the at least one present characteristic of the radio interface includes detecting one or more of: a frequency band, a bandwidth, a presence of beamforming, a signal-to-noise ratio (SNR), an uplink throughput, a characteristic of a reference signal, a characteristic of a channel of the radio interface, an amount of interference, or a radio access technology (RAT).

Example 18. The method of any one of examples 15-17, wherein detecting the at least one of the one of the more conditions at the UE includes determining a present usage of computational resources at the UE based on one or more tasks executing at the UE.

Example 19. The method of the preceding example, wherein determining the present usage of the computational resources at the UE includes determining at least one of: a present usage of a central processing unit (CPU) of the UE, a present usage of a digital signal processor (DSP) of the UE, a present usage of a guardian service processor (GSP), or a present usage of one or more memories of the UE shared by the one or more tasks.

Example 20. The method of any one of examples 18-19, wherein determining the present usage of the computational resources at the UE includes one or more of: monitoring a power rail of the UE, or accessing an energy usage profile stored in the one or more memories of the UE, the energy usage profile indicating a respective usage level of one or more of the computational resources at the UE for each different set of one or more tasks.

Example 21. The method of any one of the preceding examples, further comprising: detecting, by the processing hardware, that a remaining amount of energy stored in a battery or an energy storage device of the UE is below a threshold level; and based on the detected remaining amount of energy stored in the battery or the energy storage device, initiating the determining of the preferred partitioning of UE energy consumption between the baseband signal processing performed by the UE and the radio interface signal processing performed by the UE.

Example 22. The method of the preceding example, wherein: a plurality of threshold levels corresponding to different remaining amounts of energy stored in the battery or the energy storage device of the UE includes the threshold level; and the method further comprises, upon detecting that the remaining amount of energy stored in the battery or the energy storage device is below another threshold level:

initiating, by the processing hardware, a respective determination, corresponding to the another threshold level, of a respective preferred partitioning of UE energy consumption between the baseband signal processing performed by the UE and the radio interface signal processing performed by the UE; and transmitting, by the processing hardware to the base station, an indication of the respective preferred partitioning of UE energy consumption of the UE.

Example 23. The method of any one of the preceding examples, wherein determining the preferred partitioning of UE energy consumption includes: determining the preferred partitioning of UE energy consumption based on a connection of the UE to mains power.

Example 24. The method of any one of the preceding examples, wherein determining the preferred partitioning of energy consumption of the UE includes at least one of: monitoring a power consumption of a modem of the UE or monitoring a power rail of the UE.

Example 25. The method of any one of the preceding examples, wherein determining the preferred partitioning of energy consumption of the UE comprises one or more of: determining a respective preferred partitioning of UE energy consumption between the baseband signal processing performed by the UE and the radio interface signal processing performed by the UE corresponding to a wireless transfer of data from the UE to the base station; determining a respective preferred partitioning of UE energy consumption between the baseband signal processing performed by the UE and the radio interface signal processing performed by the UE corresponding to a wireless transfer of data from the base station to the UE; determining a respective preferred partitioning of UE energy consumption between the baseband signal processing performed by the UE and the radio interface signal processing performed by the UE corresponding to a downlink wireless transfer of data between the UE and the base station; or determining a respective preferred partitioning of UE energy consumption between the baseband signal processing performed by the UE and the radio interface signal processing performed by the UE corresponding to an uplink wireless transfer of data between the UE and the base station.

Example 26. The method of any one of the preceding examples, wherein transmitting the indication of the preferred partitioning of UE energy consumption between the baseband signal processing performed by the UE and the radio interface signal processing performed by the UE during the wireless transfer of data between the UE and the base station comprises transmitting a profile of multiple, different preferred partitionings of UE energy consumption between the baseband signal processing performed by the UE and the radio interface signal processing performed by the UE corresponding to different sets of conditions at the UE.

Example 27. The method of any one of the preceding examples, further comprising at least one of: sending, by the processing hardware, first transmissions to the base station based on the transmitted indication; or receiving, by the processing hardware, second transmissions from the base station based on the transmitted indication.

Example 28. The method of the preceding example, wherein:

determining the preferred partitioning of UE energy consumption of the UE between the baseband signal processing performed by the UE and the radio interface signal processing performed by the UE during the wireless transfer of data between the UE and the base station includes determining a magnitude of an efficiency of energy usage of the UE for the baseband signal processing during the wireless transfer of data relative to a magnitude of the efficiency of energy usage of the UE for the radio interface signal processing during the wireless transfer of data;

sending the first transmissions to the base station based on the transmitted indication includes consuming, by the UE during the sending of the first transmissions, energy for baseband signal processing of the first transmissions at an efficiency greater than or equal to the magnitude of energy usage efficiency of the UE for the baseband signal processing during the wireless transfer of data; and receiving the second transmissions from the base station based on the transmitted indication includes consuming, by the UE during the receiving of the second transmissions, energy for baseband signal processing of the second transmissions at an efficiency greater than or equal to the magnitude of energy usage efficiency of the UE for the baseband signal processing during the wireless transfer of data.

Example 29. The method of any one of examples 27-28, wherein the method further comprises receiving, by the processing hardware from the base station, an indication of a prescribed complexity of the baseband signal processing of the wireless transfer of data between the UE and the base station, the prescribed level of complexity of the baseband signal processing determined by the base station based on the transmitted indication; and wherein: sending the first transmissions to the base station based on the transmitted indication includes sending the first transmissions to the base station in accordance with the prescribed level of complexity of the baseband signal processing; and receiving the second transmissions from the base station based on the transmitted indication includes receiving the second transmissions from the base station in accordance with the prescribed level of complexity of the baseband signal processing.

Example 30. The method of example 29, wherein: transmitting the indication of the preferred partitioning of UE energy consumption between baseband signal processing performed by the UE and radio interface signal processing performed by the UE includes transmitting an indication of a preferred level of complexity of the baseband signal processing; and the prescribed level of complexity of the baseband signal processing received from the base station is the preferred level of complexity of the baseband signal processing indicated by the UE.

Example 31. The method of example 29, wherein: transmitting the indication of the preferred partitioning of UE energy consumption between baseband signal processing performed by the UE and radio interface signal processing performed by the UE includes transmitting an indication of a preferred level of complexity of the baseband signal processing; and the prescribed level of complexity of the baseband signal processing received from the base station is different from the preferred level of complexity of the baseband signal processing indicated by the UE.

Example 32. A method in a network entity for managing energy consumption at a user equipment device (UE) for wireless communications, the method comprising:

obtaining, by processing hardware of a base station, an indication of a preferred partitioning of energy consumption of the UE between baseband signal processing performed by the UE and radio interface signal processing performed by the UE during wireless transfer of data between the UE and the base station;

determining, by processing hardware based on the indication of the preferred partitioning of UE energy consumption and a communication scheme utilized by the UE and the base station, one or more communication parameters to utilize during the wireless transfer of data between the UE and the base station; and at least one of: sending, by the processing hardware, first transmissions to the UE by utilizing the communication scheme and the one or more communication parameters; or receiving, by the processing hardware, second transmissions from the UE by utilizing the communication scheme and the one or more communication parameters.

Example 33. The method of example 32, wherein obtaining the indication of the preferred partitioning of UE energy consumption between the baseband signal processing performed by the UE and the radio interface signal processing performed by the UE during the wireless transfer of data between the UE and the base station includes receiving, from the UE, the indication of the preferred partitioning of UE energy consumption.

Example 34. The method of any one of examples 32-33, wherein obtaining the indication of the preferred partitioning of UE energy consumption between the baseband signal processing performed by the UE and the radio interface signal processing performed by the UE during the wireless transfer of data between the UE and the base station includes receiving an indication of one or more present physical conditions of one or more components of the UE.

Example 35. The method of the preceding example, wherein the one or more present physical conditions of the one or more components of the UE include at least one of: an amount of remaining energy stored in a battery or in an energy storage device of the UE, or an amount of heat presently generated by the one or more components of the UE.

Example 36. The method of any one of examples 32-35, wherein obtaining the indication of the preferred partitioning of UE energy consumption between the baseband signal processing performed by the UE and the radio interface signal processing performed by the UE during the wireless transfer of data between the UE and the base station includes accessing a profile of stored energy usage of the UE, the stored energy usage profile of the UE stored in a memory of the base station.

Example 37. The method of the preceding example, further comprising obtaining, by the processing hardware, the stored energy usage profile from the UE and storing the stored energy usage profile in the memory of the base station.

Example 38. The method of any one of examples 36-37, wherein the stored energy usage profile of the UE stores an indication of one or more respective levels of complexity of radio interface signal processing for each communication scheme of a plurality of communication schemes supported by the UE.

Example 39. The method of any one of examples 36-38, wherein the stored energy usage profile of the UE stores an indication of one or more respective levels of complexity of baseband signal processing corresponding to one or more physical conditions of the UE.

Example 40. The method of any one of examples 32-39, wherein: the indication of the preferred partitioning of energy consumption of the UE between the baseband signal processing performed by the UE and the radio interface signal processing performed by the UE during the wireless transfer of data between the UE and the base station includes a requested level of complexity of at least one of the baseband signal processing or the radio interface signal processing; and determining the one or more communication parameters based on the indication of the preferred partitioning of UE energy consumption and the communication scheme includes modifying the requested level complexity and determining the one or more communication parameters in accordance with the modified level of complexity.

Example 41. The method of any one of examples 32-39, wherein: the indication of the preferred partitioning of energy consumption of the UE between the baseband signal processing performed by the UE and the radio interface signal processing performed by the UE during the wireless transfer of data between the UE and the base station includes a requested level of complexity of at least one of the baseband signal processing or the radio interface signal processing; and determining the one or more communication parameters based on the indication of the preferred partitioning of energy consumption of the UE and the communication scheme includes determining the one or more communication parameters in accordance with the requested level of complexity.

Example 42. The method of any one of examples 32-41, further comprising: obtaining an updated communication scheme for the UE and the base station to utilize during the wireless transfer of data between the UE and the base station; determining, by processing hardware based on the updated communication scheme and the preferred partitioning of UE energy consumption, an updated one or more communication parameters to utilize during the wireless transfer of data; and at least one of: sending, by the processing hardware, first additional transmissions to the UE by utilizing the updated communication scheme and the updated one or more communication parameters; or receiving, by the processing hardware, second additional transmissions from the UE by utilizing the updated communication scheme and the updated one or more communication parameters.

Example 43. The method of any one of examples 32-42, further comprising:

obtaining, by the processing hardware, an indication of an updated preferred partitioning of UE energy consumption between the baseband signal processing performed by the UE and the radio interface signal processing performed by the UE during the wireless transfer of data between the UE and the base station;

determining, by processing hardware based on the updated preferred partitioning of energy consumption of the UE, an updated one or more communication parameters to utilize during the transfer of data; and at least one of: sending, by the processing hardware, first additional transmissions to the UE by utilizing the updated one or more communication parameters; or receiving, by the processing hardware, second additional transmissions from the UE by utilizing the updated one or more communication parameters.

Example 44. The method of the preceding example, wherein obtaining the indication of the updated preferred partitioning of UE energy consumption includes receiving, by the processing hardware from the UE, an indication of the updated preferred partitioning of UE energy consumption.

Example 45. The method of any one of examples 32-44, wherein determining the one or more communication parameters to utilize during the wireless transfer of data between the UE and the base station comprises determining one or more parameters corresponding to at least one of source coding, source decoding, data compression, data decompression, or another type of baseband signal processing.

Example 46. The method of any one of examples 32-45, wherein determining the one or more communication parameters to utilize during the wireless transfer of data between the UE and the base station comprises determining one or more parameters corresponding to at least one of channel coding, channel decoding, modulation, demodulation, or another type of radio interface signal processing.

Example 47. A base station configured to perform the method of any one of examples 32-46.

Example 48. One or more tangible, non-transitory memories storing an energy usage profile for a User Equipment (UE), the energy usage profile indicating a respective level of complexity of baseband signal processing to utilize during wireless data transfer between the UE and a base station for each level of a plurality of levels of complexity of radio interface signal processing supported by UE, wherein:

each level of complexity of baseband signal processing corresponds to a respective magnitude of an efficiency of energy usage of the UE to perform baseband signal processing at the each level of complexity of baseband signal processing;

each level of complexity of radio interface signal processing corresponds to a respective magnitude of an efficiency of energy usage of the UE to perform radio interface signal processing at the each level of complexity of radio interface signal processing;

within the energy usage profile, increasing magnitudes of energy usage efficiency of the UE to perform the respective levels of complexity of baseband signal processing are associated with decreasing magnitudes of energy usage efficiency of the UE to perform the associated levels of complexity of radio interface signal processing; and the UE and the base station wirelessly transfer data therebetween based on the stored energy usage profile of the UE.

Example 49. The one or more tangible, non-transitory memories of example 46, wherein the UE stores the energy usage profile.

Example 50. The one or more tangible, non-transitory memories of any one of examples 48-49, wherein the UE determines at least a portion of the energy usage profile based on one or more conditions detected by the UE.

Example 51. The one or more tangible, non-transitory memories of the preceding example, wherein the one or more conditions detected by the UE include at least one of: a usage of resources at the UE, a condition of one or more components of the UE, or a characteristic of a radio interface communicatively connecting the UE and the base station.

Example 52. The one or more tangible, non-transitory memories of any one of examples 48-51, wherein the UE is configured with at least a portion of the energy usage profile.

Example 53. The one or more tangible, non-transitory memories of any one of examples 48-52, wherein the base station stores the energy usage profile.

Example 54. The one or more tangible, non-transitory memories of the preceding example, wherein the base station obtains at least a portion of the energy usage profile from the UE.

Example 55. The one or more tangible, non-transitory memories of any one of examples 53-54, wherein the base station stores a plurality of energy usage profiles respectively corresponding to different UEs.

Example 56. The one or more tangible, non-transitory memories of any one of examples 53-55, wherein the base station receives an update to the energy usage profile of the UE and modifies the stored energy usage profile of the UE based on the received update.

Example 57. The one or more tangible, non-transitory memories of any one of examples 48-56, wherein: the base station determines one or more communication parameters to utilize during the wireless transfer of data between the UE and the base station, the determination based on contents of the energy usage profile of the UE and one or more conditions at one or more of: the UE, the base station, or a communications network including the base station; and the base station utilizes the one or more communication parameters during the wireless transfer of data between the UE and the base station.

Example 58. The one or more tangible, non-transitory memories of any one of examples 48-57, wherein the each level of complexity of baseband signal processing corresponds to a respective level of complexity of at least one of: source coding, source decoding, data compression, or data decompression.

Example 59. The one or more tangible, non-transitory memories of any one of examples 48-58, wherein the each level of complexity of radio interface signal processing corresponds to a respective level of complexity of at least one of: a channel coding scheme, a modulation scheme, a channel decoding scheme, or a demodulation scheme.

Example 60. The one or more tangible, non-transitory memories of any one of examples 48-59, wherein the energy usage profile indicates at least one of:

one or more respective levels of complexity of baseband signal processing and associated levels of complexity of radio interface signal processing to utilize during uplink wireless data transfer between the UE and the base station;

one or more respective levels of complexity of baseband signal processing and associated levels of complexity of radio interface signal processing to utilize during downlink wireless data transfer between the UE and the base station;

one or more respective levels of complexity of baseband signal processing and associated levels of complexity of radio interface signal processing to utilize during a wireless data transfer from the UE to the base station; or one or more respective levels of complexity of baseband signal processing and associated levels of complexity of radio interface signal processing to utilize during a wireless data transfer from the base station to the UE.

Example 61. The one or more tangible, non-transitory memories of any one of examples 48-60, wherein the respective magnitudes of efficiency of energy usage of the UE are indicated in units of bytes of data transferred per unit of power consumed by the UE.

Example 62. The one or more tangible, non-transitory memories of any one of examples 48-61, wherein a total amount of energy consumed by the UE for performing, during the wireless data transfer, each level of complexity of baseband signal processing and associated level of complexity of radio interface signal processing remains relatively constant across the respective levels of complexity of baseband signal processing indicated by the energy usage profile of the UE.

Example 63. The one or more tangible non-transitory memories of the preceding example, wherein:

the total amount of energy consumed by the UE for performing the each level of complexity of baseband signal processing and associated level of complexity of radio interface signal processing during the wireless data transfer is a first total amount of energy consumed by the UE; the energy usage profile of the UE is a first energy usage profile; and the one or more tangible, non-transitory memories further store a second energy usage profile of the UE corresponding to a second total amount of energy consumed by the UE for performing, during the wireless data transfer, each level of complexity of baseband signal processing and associated level of complexity of radio interface signal processing indicated by the second energy usage profile of the UE.

Example 64. The base station of any one of examples 48-63, wherein the base station includes the one or more tangible, non-transitory memories.

Example 65. The UE of any one of examples 48-63, wherein the UE includes the one or more tangible, non-transitory memories.

Example 66. A User Equipment (UE) configured to perform the method of any one of examples 1-31.

Example 67. Any one of the preceding examples in combination with any other one of the preceding examples.

What is claimed is:

1. A method in a user equipment device (UE) for managing energy usage of the UE for wireless communications, the method comprising:

calculating, by the UE, a preferred partitioning of energy consumption of the UE between baseband signal processing performed by the UE and radio interface signal processing performed by the UE during wireless transfer of data between the UE and a base station; and transmitting, by the processing hardware UE to the base station, an indication of the preferred partitioning of UE energy consumption.

2. The method of claim 1, wherein determining the preferred partitioning of energy consumption of the UE includes determining a magnitude of energy usage efficiency of the UE for at least one of: source coding, source decoding, data compression, data decompression, or another technique utilized by the UE during the baseband signal processing.

3. The method of claim 2, wherein determining the preferred partitioning of energy consumption of the UE includes determining a magnitude of energy usage efficiency of the UE for at least one of: channel coding, channel decoding, modulating, demodulating, or another technique utilized by the UE during radio interface signal processing.

4. The method of claim 3, wherein determining the preferred partitioning of energy consumption of the UE includes:

determining an amount of power needed by the UE for the baseband signal processing during a transfer of a byte of data between the UE and the base station; and determining an amount of power needed by the UE for the radio interface signal processing during the wireless transfer of the byte of data between the UE and the base station.

5. The method of claim 4, further comprising:

detecting, by the UE, at least one of: a change to a wireless connection between the UE and the base station or a change to a remaining amount of energy stored in a battery or energy storage device of the UE;

based on the detected at least one change, determining an updated preferred partitioning of energy consumption between the baseband signal processing and the radio interface signal processing performed by the UE; and transmitting, by the UE to the base station, an indication of the updated preferred partitioning of energy consumption.

6. The method of claim 5, wherein detecting the change to the wireless connection between the UE and the base station includes detecting a change to at least one of: a modulation coding scheme, a channel condition, a frequency band, or a radio access technology, or another radio interface characteristic.

7. The method of claim 6, wherein detecting the change to the wireless connection between the UE and the base station includes detecting a change to one or more of: a frequency band, a bandwidth, a presence of beamforming, a signal-to-noise ratio (SNR), an uplink throughput, a characteristic of a reference signal, a characteristic of a channel of a radio interface, an amount of interference, or a radio access technology (RAT) corresponding to the wireless connection.

8. The method of claim 7, further comprising determining, by the UE, a present usage of computational resources at the UE, including at least one of:

determining a present usage of a central processing unit (CPU) of the UE, determining a present usage of a digital signal processor (DSP) of the UE, determining a present usage of a guardian service processor (GSP), determining a present usage of one or more memories of the UE shared by one or more tasks, monitoring a power rail of the UE, monitoring a power consumption of a modem of the UE, or accessing an energy usage profile stored in the one or more memories of the UE, the energy usage profile indicating a respective usage level of one or more of the computational resources at the UE for each different set of one or more tasks; and wherein determining the preferred partitioning of energy consumption of the UE is based on the present usage of the computational resources at the UE.

9. The method of claim 8, further comprising:

detecting, by the UE, that a remaining amount of energy stored in a battery or an energy storage device of the UE is below a threshold level; and based on the detected remaining amount of energy stored in the battery or the energy storage device, initiating the determining of the preferred partitioning of UE energy consumption between the baseband signal processing performed by the UE and the radio interface signal processing performed by the UE.

10. The method of claim 9, wherein determining the preferred partitioning of UE energy consumption includes:

determining the preferred partitioning of UE energy consumption based on a connection of the UE to mains power.

11. The method of claim 10, wherein determining the preferred partitioning of energy consumption of the UE comprises one or more of:

determining a respective preferred partitioning of UE energy consumption between the baseband signal processing performed by the UE and the radio interface signal processing performed by the UE corresponding to a wireless transfer of data from the UE to the base station;

determining a respective preferred partitioning of UE energy consumption between the baseband signal processing performed by the UE and the radio interface signal processing performed by the UE corresponding to a wireless transfer of data from the base station to the UE;

determining a respective preferred partitioning of UE energy consumption between the baseband signal processing performed by the UE and the radio interface signal processing performed by the UE corresponding to a downlink wireless transfer of data between the UE and the base station; or determining a respective preferred partitioning of UE energy consumption between the baseband signal processing performed by the UE and the radio interface signal processing performed by the UE corresponding to an uplink wireless transfer of data between the UE and the base station.

12. The method of claim 11, further comprising at least one of:

sending, by the UE, first transmissions to the base station based on the transmitted indication; or receiving, by the UE, second transmissions from the base station based on the transmitted indication.

13. A method in a network entity for managing energy consumption at a user equipment device (UE) for wireless communications, the method comprising:

receiving, by a base station from the UE, an indication of a preferred partitioning of energy consumption of the UE between baseband signal processing performed by the UE and radio interface signal processing performed by the UE during wireless transfer of data between the UE and the base station;

controlling, by the base station based on the indication of the preferred partitioning of UE energy consumption, and a communication scheme utilized by the UE and the base station, one or more communication parameters to utilize during the wireless transfer of data between the UE and the base station; and at least one of:

sending, by the base station, first transmissions to the UE by utilizing the communication scheme and the one or more communication parameters; or receiving, by the base station, second transmissions from the UE by utilizing the communication scheme and the one or more communication parameters.

14. The method of claim 13, wherein receiving the indication of the preferred partitioning of UE energy consumption between the baseband signal processing performed by the UE and the radio interface signal processing performed by the UE during the wireless transfer of data between the UE and the base station includes receiving an indication of one or more present physical conditions of one or more components of the UE.

15. The method of claim 14, wherein the one or more present physical conditions of the one or more components of the UE include at least one of: an amount of remaining energy stored in a battery or in an energy storage device of the UE, or an amount of heat presently generated by the one or more components of the UE.

16. The method of claim 15, wherein:

the indication of the preferred partitioning of energy consumption of the UE between the baseband signal processing performed by the UE and the radio interface signal processing performed by the UE during the wireless transfer of data between the UE and the base station includes a requested level of complexity of at least one of the baseband signal processing or the radio interface signal processing; and determining the one or more communication parameters based on the indication of the preferred partitioning of energy consumption of the UE and the communication scheme includes determining the one or more communication parameters in accordance with the requested level of complexity.

17. The method of claim 16, further comprising:

obtaining an updated communication scheme for the UE and the base station to utilize during the wireless transfer of data between the UE and the base station;

determining, by base station based on the updated communication scheme and the preferred partitioning of UE energy consumption, an updated one or more communication parameters to utilize during the wireless transfer of data; and at least one of:

sending, by the base station, first additional transmissions to the UE by utilizing the updated communication scheme and the updated one or more communication parameters; or receiving, by the base station, second additional transmissions from the UE by utilizing the updated communication scheme and the updated one or more communication parameters.

18. The method of claim 17, further comprising:

receiving, by the base station from the UE, an indication of an updated preferred partitioning of UE energy consumption between the baseband signal processing performed by the UE and the radio interface signal processing performed by the UE during the wireless transfer of data between the UE and the base station;

determining, by the base station based on the updated preferred partitioning of energy consumption of the UE, an updated one or more communication parameters to utilize during the transfer of data; and at least one of:

sending, by the base station, first additional transmissions to the UE by utilizing the updated one or more communication parameters; or receiving, by the base station, second additional transmissions from the UE by utilizing the updated one or more communication parameters.

19. The method of claim 18, wherein determining the one or more communication parameters to utilize during the wireless transfer of data between the UE and the base station comprises determining one or more parameters corresponding to at least one of source coding, source decoding, data compression, data decompression, or another type of baseband signal processing.

20. The method of claim 19, wherein determining the one or more communication parameters to utilize during the wireless transfer of data between the UE and the base station comprises determining one or more parameters corresponding to at least one of channel coding, channel decoding, modulation, demodulation, or another type of radio interface signal processing.

* * * * *